United States Patent
Shi et al.

(10) Patent No.: US 11,665,707 B2
(45) Date of Patent: *May 30, 2023

(54) INFORMATION TRANSMISSION METHOD, DEVICE AND COMPUTER-READABLE MEDIUM

(71) Applicant: GUANGDONG OPPO MOBILE TELECOMMUNICATIONS CORP., LTD., Guangdong (CN)

(72) Inventors: Zhihua Shi, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 15 days.

This patent is subject to a terminal disclaimer.

(21) Appl. No.: 17/313,704

(22) Filed: May 6, 2021

(65) Prior Publication Data

US 2021/0259008 A1     Aug. 19, 2021

Related U.S. Application Data

(63) Continuation of application No. 16/869,008, filed on May 7, 2020, now Pat. No. 11,122,610, which is a (Continued)

(51) Int. Cl.
*H04W 72/23* (2023.01)
*H04W 68/00* (2009.01)
(Continued)

(52) U.S. Cl.
CPC .......... *H04W 72/23* (2023.01); *H04W 68/005* (2013.01); *H04W 72/0453* (2013.01); *H04W 72/54* (2023.01)

(58) Field of Classification Search
CPC ........... H04W 72/1289; H04W 68/005; H04W 72/1226; H04W 72/23; H04W 72/54
(Continued)

(56) References Cited

U.S. PATENT DOCUMENTS

| 11,122,610 B2* | 9/2021 | Shi ................. H04W 72/1289 |
| 2013/0079040 A1* | 3/2013 | Charbit .............. H04W 4/026 455/458 |

(Continued)

FOREIGN PATENT DOCUMENTS

| CN | 105101044 A | 11/2015 |
| CN | 105992342 A | 10/2016 |

(Continued)

OTHER PUBLICATIONS

3GPP TSG RAN WG1 NR Ad-Hoc #2 R1-1710872, Qingdao, China, Jun. 27-30, 2017, Agenda Item: 5.1.3.1.2.1, Source: InterDigital Inc., Title: CORESET Monitoring Under Dynamic Change of BWP, Document for: Discussion, Decision. 5 pages.

(Continued)

*Primary Examiner* — Nghi H Ly
(74) *Attorney, Agent, or Firm* — Perkins Coie LLP

(57) ABSTRACT

An information transmission method, a device, and a computer readable medium are provided. The method comprises: receiving a paging message corresponding to the UE according to information associated with the UE; wherein the information comprises at least one of: a Paging-Radio Network Temporary Identity (P-RNTI) corresponding to the UE, a Control Resource SET (CORESET) corresponding to the UE and a search space corresponding to the UE; wherein receiving the paging message corresponding to the UE according to the information associated with the UE comprises: at a Paging Occasion (PO) of the UE, detecting Downlink Control Information (DCI) sent by a network (Continued)

device based on the information associated with the UE and receiving the DCI; receiving a Physical Downlink Shared Channel (PDSCH) according to the DCI; and acquiring the paging message from the PDSCH.

14 Claims, 10 Drawing Sheets

Related U.S. Application Data continuation of application No. PCT/CN2017/110579, filed on Nov. 10, 2017.

(51) Int. Cl.
*H04W 72/0453* (2023.01)
*H04W 72/54* (2023.01)

(58) Field of Classification Search
USPC .................. 455/450, 422.1, 452.1, 466, 418
See application file for complete search history.

(56) References Cited

U.S. PATENT DOCUMENTS

| | | | |
|---|---|---|---|
| 2013/0114563 A1* | 5/2013 | Oizumi | H04W 72/0446 370/329 |
| 2016/0205660 A1 | 7/2016 | Ryu et al. | |
| 2016/0205661 A1 | 7/2016 | Ryu et al. | |
| 2017/0105166 A1* | 4/2017 | Lee | H04W 48/12 |
| 2017/0273078 A1 | 9/2017 | Rico Alvarino et al. | |
| 2017/0347335 A1 | 11/2017 | Yi et al. | |
| 2018/0376451 A1 | 12/2018 | Wong | |
| 2020/0187158 A1 | 6/2020 | Wong | |

FOREIGN PATENT DOCUMENTS

| | | |
|---|---|---|
| CN | 106572534 A | 4/2017 |
| CN | 107211392 A | 9/2017 |
| CN | 107251625 A | 10/2017 |
| CN | 107566225 A | 1/2018 |
| EP | 2453710 A1 | 5/2012 |
| EP | 2453710 B1 | 10/2013 |
| EP | 3577935 A1 | 12/2019 |
| JP | 2009542136 A | 11/2009 |
| KR | 20160138469 A | 12/2016 |
| RU | 2603010 C2 | 11/2016 |
| WO | 2015002578 A1 | 1/2015 |
| WO | 2016072770 A1 | 5/2016 |
| WO | 2017050831 A1 | 3/2017 |
| WO | 2017160440 A1 | 9/2017 |
| WO | 2018144873 A1 | 8/2018 |

OTHER PUBLICATIONS

3GPP TSG RAN WG1 Meeting #90bis R1-1717462, Prague, Czech Republic, Oct. 9-13, 2017, Source: vivo, Title: Remaining details on NR paging design. Agenda Item: 7.1.3, Document for: Discussion and Decision. 5 pages.
First Office Action of the Japanese application No. 2020-524834, dated Oct. 12, 2021. 8 pages with English translation.
CNIPA, First Office Action of the Chinese application No. 202010430748.0 dated May 26, 2021. 23 pages with English translation.
IPI, Office Action of the Indian application No. 202027024051, dated Jul. 27, 2021. 8 pages with English translation.
KIPO, Notification of Reason for Refusal for Korean application No. 10-2020-7016497 dated May 28, 2021. 11 pages with English translation.
CIPO, First Office Action for Canadian Patent Application No. 3081882. dated Jun. 23, 2021. 5 pages.
USPTO, Corrected Notice of Allowability dated Aug. 18, 2021 of U.S. Appl. No. 16/869,008, filed May 7, 2020.
USPTO, Corrected Notice of Allowability dated Jul. 15, 2021 of U.S. Appl. No. 16/869,008, filed May 7, 2020.
USPTO, Corrected Notice of Allowability dated Jun. 16, 2021 of U.S. Appl. No. 16/869,008, filed May 7, 2020.
CATT. Remaining Issues on Paging Transmission for Rel-13 Low Complexity UEs and UEs in Enhanced Coverage. 3GPP TSG RAN WG1 Meeting #82bis R1-155177. Oct. 9, 2015(Oct. 9, 2015), part 2.
International Search Report in the international application No. PCT/CN2017/110579, dated Jul. 31, 2018.
Written Opinion of the International Search Authority in the international application No. PCT/CN2017/110579, dated Jul. 31, 2018.
Samsung, NR paging channel design, Discussion and Decision, 3GPP TSG RAN WG1 Meeting #87 R1-1612458, dated Nov. 14-18, 2016.
Intel Corporation, NR Paging Design, Discussion and Decision, 3GPP TSG RAN WG1 Meeting NR Ad-hoc#2 R1-1710509, dated Jun. 27-30, 2017.
Supplementary European Search Report in the European application No. 17931643.5, dated Aug. 7, 2020.
First Office Action of the Russian application No. 2020119001, dated Feb. 24, 2021.
Non-Final Office Action of the U.S. Appl. No. 16/869,008, dated Aug. 27, 2020.
Notice of Allowance of the U.S. Appl. No. 16/869,008, dated Feb. 8, 2021.
Supplemental Notice of Allowance of the U.S. Appl. No. 16/869,008, dated May 4, 2021.

* cited by examiner

INFORMATION TRANSMISSION METHOD, DEVICE AND COMPUTER-READABLE MEDIUM

CROSS-REFERENCE TO RELATED APPLICATION

The present application is a continuation application of U.S. application Ser. No. 16/869,008 filed on May 7, 2020, which is a continuation application of International Application No. PCT/CN2017/110579 filed on Nov. 10, 2017, the disclosure of which are hereby incorporated by reference in their entireties.

BACKGROUND

With the development of communication technologies, researches on 5th Generation (5G) have been made. Radio access of 5G is called New Radio (NR). In an NR/5G system, due to application of multiple beams technology, in order for User Equipments (UE) to be successfully paged, a network side sends a paging message to the UEs in a beam sweeping manner. That is, the network side needs to send the paging message on different analog beams. When the number of beams need to be swept is N, the network side needs to repeatedly send the paging message for N times, which may increase a paging delay. Furthermore, if a single paging message may not complete the paging for all UEs at one time, a plurality of paging messages need to be sent, which, together with the N beams need to be swept, may further increase the paging delay.

SUMMARY

Embodiments of the disclosure relate to the technical field of wireless communication, and more particularly, to an information transmission method, a device and a computer-readable medium.

The technical solutions of the embodiments of the disclosure may be implemented as follows.

According to a first aspect, the embodiments of the disclosure provide an information transmission method, which may be applied to UE and include the following operations.

A paging message corresponding to the UE is received according to information associated with the UE.

The information comprises at least one of:

a Paging-Radio Network Temporary Identity (P-RNTI) corresponding to the UE, a Control Resource SET (CORESET) corresponding to the UE and a search space corresponding to the UE;

The operation that the paging message corresponding to the UE is received according to the information associated with the UE comprises:

at a Paging Occasion (PO) of the UE, Downlink Control Information (DCI) sent by a network device is detected based on the information associated with the UE and the DCI is received:

a Physical Downlink Shared Channel (PDSCH) is received according to the DCI; and the paging message is acquired from the PDSCH.

According to a second aspect, the embodiments of the disclosure provide UE, which may include a second network interface, a second memory and a second processor.

The second network interface may be configured to receive and send a signal in a process of receiving and sending information with other external network elements.

The second memory may be configured to store a computer program capable of running on the second processor.

The second processor may be configured to execute the steps of the method in the first aspect when the computer program is running on the first processor.

According to a third aspect, the embodiments of the disclosure provide a non-transitory computer-readable medium, which may store an information transmission program that, when executed by at least one processor, implement the steps of the method in the first aspect.

DETAILED DESCRIPTION

Figure 1:
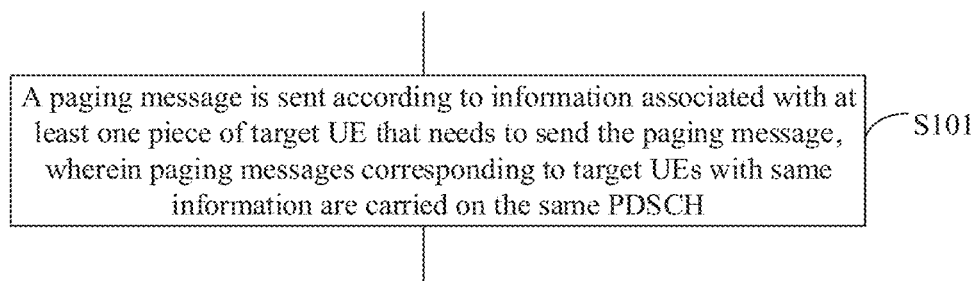
FIG. 1 is a schematic flowchart of an information transmission method according to an embodiment of the disclosure.

For making the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

In the current LTE related art, in a system, one PDSCH is scheduled by DCI sent through a Physical Downlink Control channel (PDCCH) which is scrambled by a Paging-Radio Network Temporary Identity (P-RNTI), and a single PDSCH carries one paging message. The paging message may include paging notifications for a plurality of UEs. Based on this, in a 5G/NR system, according to the technical solutions of the embodiments of the disclosure, a plurality pieces of DCI may be sent at the same time, although a single piece of DCI still only allocates and schedules one PDSCH to carry one paging message, if the paging message still includes paging notifications for a plurality of UEs, more users may be notified within the same time, compared with that in the current LTE related art. In addition, the UE may also be scheduled outside a minimum UE bandwidth range to receive the PDSCH, such that scheduling opportunities are increased by increasing frequency-domain resources available for paging, which may further reduce a paging delay.

The embodiments of the disclosure provide at least the following aspects.

According to a first aspect, the embodiments of the disclosure provide an information transmission method, which may be applied to a network-side device and include the following operations.

A paging message is sent according to information associated with at least one target UE to which the paging message needs to be sent, wherein paging messages corresponding to target UEs with same information are carried on a same Physical Downlink Shared Channel (PDSCH).

According to a second aspect, the embodiments of the disclosure provide an information transmission method, which may be applied to UE and include the following operations.

A paging message corresponding to the UE is received according to information associated with the UE.

According to a third aspect, the embodiments of the disclosure provide a network-side device, which may include a sending part, configured to send a paging message according to information associated with at least one target UE to which the paging message needs to be sent, wherein the paging messages corresponding to target UEs with same information are carried on a same PDSCH.

According to a fourth aspect, the embodiments of the disclosure provide UE, which may include a receiving part, configured to receive a paging message corresponding to the UE according to information associated with the UE.

According to a fifth aspect, the embodiments of the disclosure provide a network-side device, which may include a first network interface, a first memory and a first processor.

The first network interface may be configured to receive and send a signal in a process of receiving and sending information with other external network elements.

The first memory may be configured to store a computer program capable of running on the first processor.

The first processor may be configured to execute the steps of the method in the first aspect when the computer program is running on the first processor.

According to a sixth aspect, the embodiments of the disclosure provide UE, which may include a second network interface, a second memory and a second processor.

The second network interface may be configured to receive and send a signal in a process of receiving and sending information with other external network elements.

The second memory may be configured to store a computer program capable of running on the second processor.

The second processor may be configured to execute the steps of the method in the second aspect when the computer program is running on the first processor.

According to a seventh aspect, the embodiments of the disclosure provide a non-transitory computer-readable medium, which may store an information transmission program that, when executed by at least one processor, implement the steps of the method in the first aspect or the second aspect.

Based on the above contents, the technical solutions of the embodiments of the disclosure will be described below through a plurality of atypical embodiments.

Embodiment 1

Referring to FIG. 1, an information transmission method provided in the embodiment of the disclosure is illustrated. The method may be applied to a network-side device paging UE, for example, a gNB in 5G. The method may include the following steps.

In S101, a paging message is sent according to information associated with at least one target UE to which the paging message needs to be sent, wherein paging messages corresponding to target UEs with same information are carried on a same PDSCH.

It is to be noted that, at a present moment, the network-side device, when sending the paging messages, may encapsulate the paging messages, which correspond to the target UE with the same information, into the same DCI. And then, if a plurality pieces of DCI may be sent at the same time, multiple PDSCHs may be sent within the same time and more users may be notified, such that a paging delay may be reduced.

For the technical solution in FIG. 1, the information associated with the target UE includes any one of:

a P-RNTI corresponding to the target UE, a Control Resource SET (CORESET) corresponding to the target UE or a search space corresponding to the target UE.

Preferably, for the information, all target UEs may be associated with respective P-RNTIs, CORESETs or search spaces according to attribute parameters of the UEs.

During specific implementation, all UEs may be classified according to the attribute parameters of the UEs. After at least one UE category is obtained, a P-RNTI, CORESET or search space is set for each UE category. For example, the attribute parameter of the UE may include at least one of: attribute parameters, through which the UE may be classified according to a specific classification strategy, of the UE such as an identifier of the UE, the category of the UE and capability information of the UE.

Figure 2:
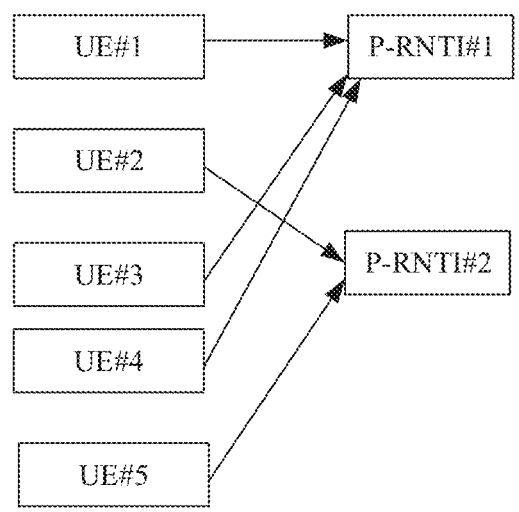
FIG. 2 is a schematic diagram of a corresponding relationship according to an embodiment of the disclosure.

Through the above specific implementation process, it may be obtained that a corresponding relationship between the UE and the information associated with the UE may be as follows. A single target UE only corresponds to a single P-RNTI, CORESET or search space; and a single P-RNTI, CORESET or search space corresponds to at least one target UE. As shown in FIG. 2, the information is the P-RNTI, the number of the UEs is 5. It may be obtained by classification according to the attribute parameters of the UEs that UE #1, UE #3 and UE #4 correspond to the same P-RNTI #1, and that UE #2 and UE #5 correspond to the same P-RNTI #2.

Based on the information associated with the target UE, preferably, the technical solution shown in FIG. 1 may further include a process of notifying the information to the UE, and specifically including the following operations.

A P-RNTI, CORESET or search space corresponding to the UE is notified to the UE through a system message, a broadcast message or Remaining Minimum System Information (RMSI).

Or, a candidate set of P-RNTIs, CORESETs or search spaces corresponding to the UE is notified to the UE through the system message, the broadcast message or the RMSI.

Or, a P-RNTI, CORESET or search space corresponding to the UE is notified to the UE through dedicated signaling.

Or, the candidate set of P-RNTIs, CORESETs or search spaces corresponding to the UE is notified to the UE through the dedicated signaling.

Or, the P-RNTI corresponding to the UE or the candidate set of the P-RNTIs corresponding to the UE is determined according to provisions of a set communication protocol.

It is to be noted that sending the candidate set of P-RNTIs, CORESETs or search spaces corresponding to the UE, to the UE may enable the UE to select the P-RNTI, CORESET or search space corresponding to the UE from the candidate set.

For the technical solution illustrated in FIG. 1, the operation that the paging messages are sent according to the information associated with the at least one target UE to which the paging message needs to be sent includes the following operation.

The paging messages, corresponding to the target UEs with the same information, of all paging messages are carried on the same PDSCH, physical DCI corresponding to each PDSCH corresponding to the information corresponding to the target UE.

For the above contents, it can be understood that, taking the P-RNTI as an example, the network-side device determines the paging messages required to be sent according to the target UEs presently required to be paged. Then the network-side device may send, according to different target UEs, at least one PDSCH carrying the paging messages at the same time, such that there may be DCIs in an amount the same as the number of the PDSCHs, and each piece of DCI corresponds to a different P-RNTI, that is, different target UEs may be distinguished.

For the UE, the UE may detect, according to the P-RNTI corresponding to the UE, whether the DCI sent by a network side includes DCI sent to the UE itself at its own Paging Occasion (PO). Therefore, for the target UE, even though the network-side device sends a plurality of pieces of DCI at the same time, each target UE still only needs to monitor one piece of DCI, which avoids increase of the processing complexity of a UE side. However, for the network-side device, more paging messages may be sent at the same time, such that the paging delay may be reduced when relatively more UEs need to be paged. In addition, w % ben the information associated with the UE is notified through a message configured by a system, the network may flexibly configure, according to states of the UEs in the current network, a few pieces of information to be used to distinguish a plurality of UEs.

For the technical solution illustrated in FIG. 1, by scheduling a frequency-domain resource of the PDSCH, scheduling a frequency-domain resource required by the UE to receive PDSCH is implemented, such that a requirement of compressing time resources by use of more frequency-domain resources may be met, and the paging relay is reduced. Therefore, the method further includes that: a frequency-domain resource of the PDSCH is scheduled according to a set scheduling strategy, and scheduling indication information is generated. Specifically, the following specific implementation modes are atypically and exemplarily included.

Specific Implementation Mode 1

A frequency-domain bandwidth for transmission of the PDSCH carrying the paging messages is scheduled to be less than or equal to a minimum bandwidth. A frequency-domain position for transmission of the PDSCH carrying the paging messages is scheduled within a present minimum frequency-domain range of the target UE. The scheduling indication information is generated, the frequency-domain bandwidth, indicated in the scheduling indication information, of the PDSCH being less than or equal to the minimum bandwidth, and the frequency-domain position of the PDSCH being within the present minimum frequency-domain range of the target UE.

Figure 3:
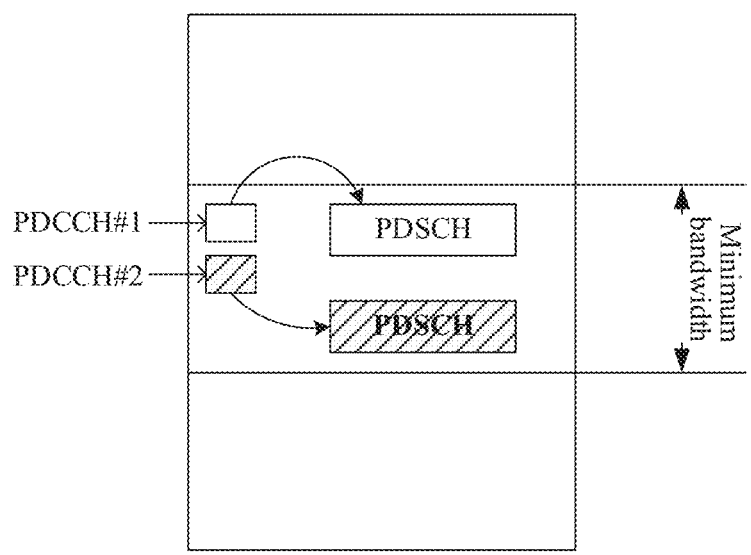
FIG. 3 is a schematic diagram of PDSCH scheduling according to an embodiment of the disclosure.

As illustrated in FIG. 3, taking two pieces of DCI to schedule two PDSCHs as an example, if the frequency-domain bandwidth of the PDSCH is scheduled to be less than or equal to the minimum bandwidth, it may be understood that the minimum bandwidth is a minimum UE bandwidth specified in a protocol. When the frequency-domain position of the PDSCH carrying the paging messages is scheduled within the present minimum frequency-domain range of the target UE, all the UEs in an idle state may directly receive the paging messages.

However, it is to be noted that, in a 5G/NR system, UE additionally has an inactive state, besides the idle state and a connected state. A terminal in the inactive state is only connected with an access network, but is not connected with a core network. Therefore, not all the UEs need to be paged are in the idle state, and furthermore, not all the target UEs' present bandwidths are within the minimum UE bandwidth. Based on this, the following specific implementation mode 2 and specific implementation mode 3 are provided.

Specific Implementation Mode 2

The frequency-domain bandwidth for transmission of the PDSCH carrying the paging messages is scheduled to be less than or equal to the minimum bandwidth.

Part of the frequency-domain position for transmission of the PDSCH carrying the paging messages are scheduled within the present minimum frequency-domain range of the target UE, and the other part of the frequency-domain position of the PDSCH are scheduled outside the present minimum frequency-domain range of the target UE. Or, the frequency-domain position of the PDSCH is scheduled outside the present minimum frequency-domain range of the target UE.

The scheduling indication information is generated. The frequency-domain bandwidth, indicated in the scheduling indication information, of the PDSCH is less than or equal to the minimum bandwidth. Part of the frequency-domain position of the PDSCH is within the present minimum frequency-domain range of the target UE, and the other part of the frequency-domain position of the PDSCH is outside the present minimum frequency-domain range of the target UE. Or, the indicated frequency-domain bandwidth of the PDSCH is less than or equal to the minimum bandwidth and the frequency-domain position of the PDSCH is outside the present minimum frequency-domain range of the target UE.

Furthermore, if the present bandwidth of the UE is the minimum bandwidth, the target UE needs to tune its own Radio Frequency (RF) parameter to receive the PDSCH. Thus, a time interval meeting a certain condition needs to be set between the DCI and the PDSCH, to ensure enough time for the UE to tune RF and demodulate the PDSCH. Therefore, the method further includes the following operation.

A time interval between the DCI and the PDSCH is set according to a set time interval setting strategy. Correspondingly, the DCI may indicate the time interval between the DCI and the PDSCH.

Figure 4:
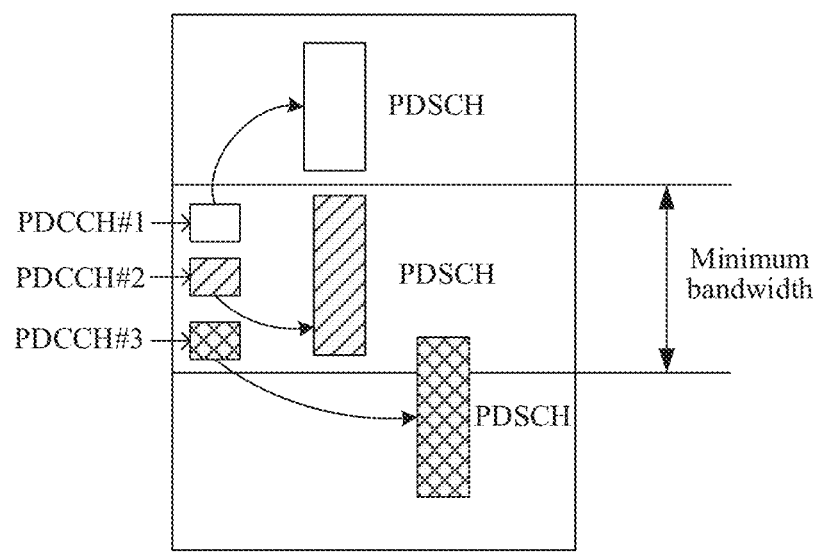
FIG. 4 is a schematic diagram of PDSCH scheduling according to an embodiment of the disclosure.

As illustrated in FIG. 4, a frequency-domain bandwidth of a PDSCH which is scheduled by DCI transmitted through a PDCCH #1 is less than or equal to the minimum bandwidth, and a frequency-domain position of the PDSCH is outside the present minimum frequency-domain range of the target UE. A frequency-domain bandwidth of the PDSCH which is scheduled by DCI transmitted through a PDCCH #3 is the minimum bandwidth, part of a frequency-domain position of the PDSCH is within the present minimum frequency-domain range of the target UE, and the other part of the frequency-domain position of the PDSCH is outside the present minimum frequency-domain range of the target UE.

According to the specific implementation mode, more frequency-domain resources may be used, such that more time resources are reduced, and the paging delay is reduced.

Specific Implementation Mode 3

A frequency-domain bandwidth for transmission of part of the PDSCH carrying the paging messages is scheduled to be less than or equal to an actual bandwidth or reported bandwidth of the target UE.

It is to be noted that the reported bandwidth may be supported bandwidth information directly reported by the UE. For example, the UE directly reports that the supported bandwidth is 20 MHz, then the network-side device may send the paging message to the UE within the reported 20 MHz bandwidth. Or, the reported bandwidth may be which bandwidth that can be supported by the UE. For example, assuming that the system specifies three bandwidths for certain transmissions, and B1<B2<B3, then the UE may report that B2 in the three bandwidths is supported.

The scheduling indication information is generated, the frequency-domain bandwidth, indicated in the scheduling indication information, of the part of the PDSCH being less than or equal to the actual bandwidth or reported bandwidth of the target UE.

Figure 5:
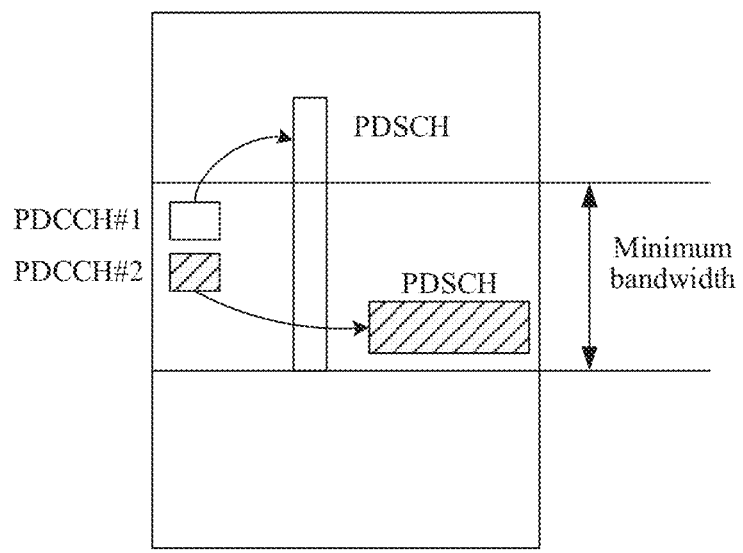
FIG. 5 is a schematic diagram of PDSCH scheduling according to an embodiment of the disclosure.

As illustrated in FIG. 5, a bandwidth of a PDSCH which is scheduled by DCI transmitted through a PDCCH #1 is greater than the minimum bandwidth, but less than or equal to the actual bandwidth or reported bandwidth of the target UE. It is to be noted that, in a practical application process, bandwidths of many UEs may be greater than the minimum bandwidth, but may not exceed their actual bandwidths or reported bandwidths. Based on that the frequency-domain bandwidth for transmission of the part of the PDSCH is scheduled to be less than or equal to the actual bandwidth or reported bandwidth of the target UE, for supporting paging transmission of this form, the method further includes the following operation.

An actual bandwidth capability of the target UE or a part of bandwidth capability that may be supported by the UE is interacted with other network-side devices. It may be understood that, when the network-side device in the embodiment is the gNB, other network-side devices may be network elements in a core network.

Through the elaborations about the technical solutions of the embodiment, a plurality pieces of DCI are sent at the same time. Although only one PDSCH is allocated and scheduled to carry a paging message for a single piece of DCI, if the paging message still includes paging notifications for a plurality of UEs, more users may be notified within the same time, compared with the conventional LTE related art, such that the paging delay may be reduced. In addition, the UE is scheduled outside the minimum UE bandwidth range to receive the PDSCH, such that frequency-domain resources available for paging are increased to increase scheduling opportunities, and the paging delay may further be reduced.

Embodiment 2

Figure 6:
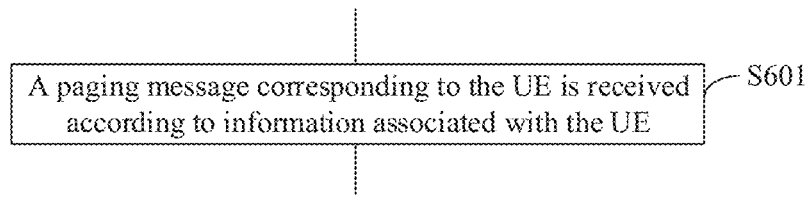
FIG. 6 is a schematic flowchart of another information transmission method according to an embodiment of the disclosure.

Based on the same inventive concept as the abovementioned embodiment, referring to FIG. 6, a method for information transmission provided in the embodiment of the disclosure is illustrated. The method is applied to UE. The method includes the following steps.

In S601, a paging message corresponding to the UE is received according to information associated with the UE.

For the technical solution illustrated in FIG. 6, the information includes at least one of:

a P-RNTI corresponding to the UE, a CORESET corresponding to the UE or a search space corresponding to the UE.

During specific implementation, all the UEs may be classified according to their own attribute parameters, and each UE category may have corresponding information, for example, a P-RNTI, a CORESET or a search space. For example, the attribute parameter of the UE may include at least one of: attribute parameters, through which the UE may be classified according to a specific classification strategy, of the UE such as an identifier of the UE, the category of the UE and capability information of the UE. Thus it may be seen that a corresponding relationship between the UE and the information may be as follows: a single UE only corresponds to a single P-RNTI, CORESET or search space; and a single P-RNTI, CORESET or search space corresponds to at least one UE.

Based on the information associated with the UE, a process of notifying the information associated with the UE may further be included, and specifically including the following operations.

The P-RNTI, CORESET or search space corresponding to the UE is determined through a system message, a broadcast message or RMSI.

Or, a candidate set of the P-RNTIs, CORESETs or search spaces corresponding to the UE is determined through the system message, the broadcast message or the RMSI.

Or, the P-RNTI, CORESET or search space corresponding to the UE is determined through dedicated signaling.

Or, the candidate set of the P-RNTIs, CORESETs or search spaces corresponding to the UE is determined through the dedicated signaling.

Or, the P-RNTI corresponding to the UE or the candidate set of the P-RNTIs corresponding to the UE is specified according to a set communication protocol.

It may be understood that the UE may select its own P-RNTI. CORESET or search space from the candidate set.

For the technical solution illustrated in FIG. 6, the operation that the paging message corresponding to the UE is received according to the information associated with the UE may specifically include the following operations.

DCI is received according to the information.

A PDSCH is received according to the DCI.

The paging message is acquired from the PDSCH.

In the above implementation mode, the operation that the DCI is received according to the information includes the following operation.

At a PO of the UE, the DCI sent by a network side is detected based on the information associated with the UE, and the DCI is received.

With reference to the technical solution of the foregoing embodiment, since the network side schedules a resource of the PDSCH, a specific implementation process that the PDSCH corresponding to the DCI is received according to scheduling indication information, carried in the DCI, of the PDSCH may atypically and exemplarily include the following specific implementation modes.

Specific Implementation Mode 1

The PDSCH is received within a present minimum frequency-domain range of the UE according to a minimum bandwidth.

Specific Implementation Mode 2

The PDSCH is received within the present minimum frequency-domain range of the UE and outside the present minimum frequency-domain range of the UE according to the minimum bandwidth.

Or, the PDSCH is received outside the present minimum frequency-domain range of the UE according to the minimum bandwidth.

Furthermore, if a present bandwidth of the UE is the minimum UE bandwidth, the UE needs to tune its own RF parameter to receive the PDSCH, and thus a time interval meeting a certain condition needs to be set between a PDCCH and the PDSCH, to ensure enough time for the UE to tune RF and demodulate the PDSCH. Therefore, after the DCI is received according to the information, the method further includes the following operation.

If a present bandwidth of the UE is within the minimum frequency-domain range, RF is tuned within a time interval indicated by the scheduling indication information of the PDSCH.

Specific Implementation Mode 3

Part of the PDSCH is received according to a bandwidth less than or equal to an actual bandwidth or reported bandwidth of the UE.

It may be understood that the above three specific implementation modes correspond to the three specific implementation modes for scheduling the resource of the PDSCH in the foregoing embodiment, and elaborations about the detailed contents are omitted in the embodiment.

Embodiment 3

Figure 7:
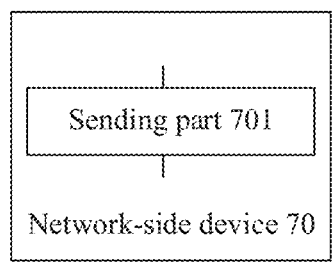
FIG. 7 is a schematic composition diagram of a network-side device according to an embodiment of the disclosure.

Based on the same inventive concept as the foregoing embodiments, referring to FIG. 7, a composition of a network-side device 70 provided in the embodiment of the disclosure is illustrated. The network-side device 70 includes a sending part 701, configured to send a paging message according to information associated with at least one target UE to which the paging message needs to be sent, the paging messages corresponding to the target UEs with the same information being carried on the same PDSCH.

In the solution, the information associated with the target UE includes any one of:

a P-RNTI corresponding to the target UE, a CORESET corresponding to the target UE or a search space corresponding to the target UE.

In the solution, the sending part 701 is further configured to notify, the P-RNTI. CORESET or search space corresponding to the UE, to the UE through a system message, a broadcast message or RMSI; or notify a candidate set of P-RNTIs, CORESETs or search spaces corresponding to the UE, to the UE through the system message, the broadcast message or the RMSI; or notify, the P-RNTI, CORESET or search space corresponding to the UE, to the UE through dedicated signaling; or notify, the candidate set of P-RNTIs. CORESETs or search spaces corresponding to the UE, to the UE through the dedicated signaling; or determine the P-RNTI corresponding to the UE or the candidate set of the P-RNTIs according to provisions of a set communication protocol.

In the solution, the sending part 701 is configured to;

carry the paging messages, corresponding to the target UEs with the same information, of all paging messages on the same PDSCH, wherein physical DCI corresponding to each PDSCH corresponds to the information corresponding to the target UE.

In the solution, the sending part 701 is further configured to schedule a frequency-domain resource of the PDSCH according to a set scheduling strategy and generate scheduling indication information.

In the solution, the sending part 701 is specifically configured to schedule a frequency-domain bandwidth for transmission of the PDSCH carrying the paging messages to be less than or equal to a minimum bandwidth:

schedule a frequency-domain position for transmission of the PDSCH carrying the paging messages within a present minimum frequency-domain range of the target UE; and generate the scheduling indication information, the frequency-domain bandwidth, indicated in the scheduling indication information, of the PDSCH being less than or equal to the minimum bandwidth, and the frequency-domain position of the PDSCH being within the present minimum frequency-domain range of the target UE.

In the solution, the sending part 701 is specifically configured to:

schedule the frequency-domain bandwidth for transmission of the PDSCH carrying the paging messages to be less than or equal to the minimum bandwidth;

schedule part of the frequency-domain position for transmission of the PDSCH carrying the paging messages within the present minimum frequency-domain range of the target UE, and schedule the other part of the frequency-domain position of the PDSCH outside the present minimum frequency-domain range of the target UE; or schedule the frequency-domain position of the PDSCH outside the present minimum frequency-domain range of the target UE; and generate the scheduling indication information, the frequency-domain bandwidth, indicated in the scheduling indication information, of the PDSCH being less than or equal to the minimum bandwidth, part of the frequency-domain position of the PDSCH being within the present minimum frequency-domain range of the target UE and the other part of the frequency-domain position of the PDSCH being outside the present minimum frequency-domain range of the target UE; or the frequency-domain bandwidth indicating the PDSCH being less than or equal to the minimum bandwidth, and the frequency-domain position of the PDSCH being outside the present minimum frequency-domain range of the target UE.

In the solution, the sending part 701 is further configured to set a time interval between the DCI and the PDSCH according to a set time interval setting strategy. Correspondingly, the DCI may be configured to indicate the time interval between the DCI and the PDSCH.

In the solution, the sending part 701 is specifically configured to schedule a frequency-domain bandwidth for transmission of part of the PDSCH carrying the paging messages to be less than or equal to an actual bandwidth or reported bandwidth of the target UE; and generate the scheduling indication information, the frequency-domain bandwidth, indicated in the scheduling indication information, of the part of the PDSCH being less than or equal to the actual bandwidth or reported bandwidth of the target UE.

In the solution, the sending part 701 is further configured to interact with other network-side devices on an actual bandwidth capability or reported bandwidth of the target UE.

It may be understood that, in the embodiment, "part" may be part of a circuit, part of a processor, part of a program or software and the like, of course, or may be a unit, or may be modular and non-modular.

In addition, each component in the embodiment may be integrated into a processing unit, each unit may also exist independently, and two or more units may also be integrated into a unit. The integrated unit may be implemented in a hardware form and may also be implemented in form of software function module.

When implemented in form of software function module, and not sold or used as an independent product, the integrated unit may be stored in a computer-readable storage medium. Based on such an understanding, the technical solution of the embodiment substantially or parts making contributions to the conventional art or all or part of the technical solution may be embodied in form of software product, and the computer software product is stored in a storage medium, including a plurality of instructions configured to enable a computer device (which may be a personal computer, a server, a network device or the like) or a processor to execute all or part of the steps of the method in the embodiment. The storage medium includes: various media capable of storing program codes such as a U disk, a mobile hard disk, a Read Only Memory (ROM), a Random Access Memory (RAM), a magnetic disk or an optical disk.

Therefore, the embodiment provides a computer-readable medium, which stores an information transmission program that, when executed by at least one processor, implements the steps of the method of embodiment 1.

Figure 8:
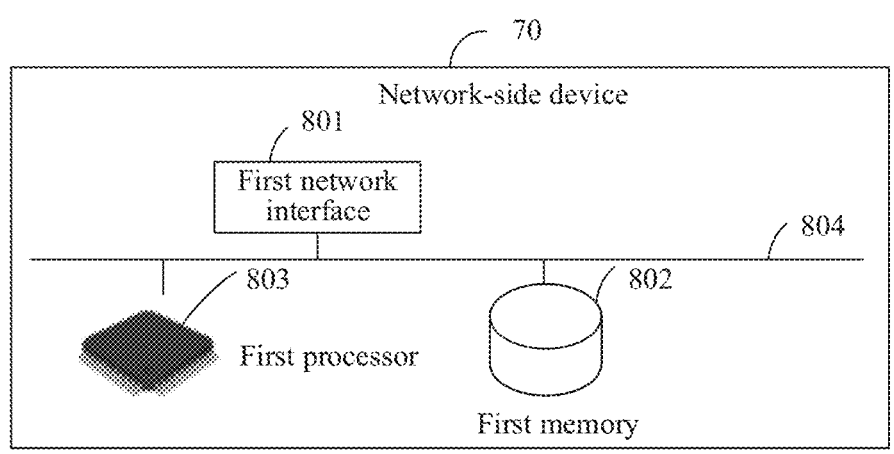
FIG. 8 is a schematic hardware structure diagram of a network-side device according to an embodiment of the disclosure.

Based on the network-side device 70 and the computer-readable medium, referring to FIG. 8, a specific hardware structure of the network-side device 70 provided in the embodiment of the disclosure is illustrated. The network-side device 70 may include a first network interface 801, a first memory 802 and a first processor 803. Each component is coupled together through a bus system 804. It may be understood that the bus system 804 is configured to implement connection communication among these components. The bus system 804 includes a data bus, and further includes a power bus, a control bus and a state signal bus. However, for clear description, various buses in FIG. 8 are marked as the bus system 804. The first network interface 801 is configured to receive and send a signal in a process of receiving and sending information with other external network elements.

The first memory 802 is configured to store a computer program capable of running on the first processor 803.

The first processor 803 is configured to execute the following operation when the computer program is running on the first processor.

A paging message is sent according to information associated with at least one target UE to which the paging message needs to be sent, the paging messages corresponding to the target UEs with the same information being carried on the same PDSCH.

It may be understood that the first memory 802 in the embodiment of the disclosure may be a volatile memory or a nonvolatile memory, or may include both the volatile and nonvolatile memories. The nonvolatile memory may be a ROM, a Programmable ROM (PROM), an Erasable PROM (EPROM), an Electrically EPROM (EEPROM) or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). It is to be noted that the first memory 802 of a system and method described in the disclosure is intended to include, but not limited to, memories of these and any other proper types.

The first processor 803 may be an integrated circuit chip with a signal processing capability. In an implementation process, each step of the method may be completed by an integrated logic circuit of hardware in the first processor 803 or an instruction in a software form. The first processor 803 may be a universal processor, a Digital Signal Processor (DSP), an Application Specific Integrated Circuit (ASIC), a Field Programmable Gate Array (FPGA) or another Programmable Logic Device (PLD), discrete gate or transistor logical device and discrete hardware component. Each method, step and logical block diagram disclosed in the embodiment of the disclosure may be implemented or executed. The universal processor may be a microprocessor, or the processor may also be any conventional processor and the like. The steps of the method disclosed in combination with the embodiment of the disclosure may be directly embodied to be executed and completed by a hardware decoding processor or executed and completed by a combination of hardware and software modules in the decoding processor. The software module may be located in a mature storage medium in this field such as a RAM, a flash memory, a ROM, a PROM or EEPROM and a register. The storage medium is located in the first memory 802. The first processor 803 reads information in the first memory 802 and completes the steps of the method in combination with hardware.

It may be understood that these embodiments described in the disclosure may be implemented by hardware, software, firmware, middleware, a microcode or a combination thereof. For hardware implementation, the processing unit may be implemented in one or more ASICs, DSPs, DSP Devices (DSPDs), PLDs, FPGAs, universal processors, controllers, microcontrollers, microprocessors, other electronic units configured to execute the functions in the application or combinations thereof.

For software implementation, the technology of the disclosure may be implemented through the modules (such as processes and functions and the like) executing the functions in the disclosure. A software code may be stored in the memory and executed by the processor. The memory may be implemented in the processor or outside the processor.

Specifically, the first processor 803 in the network-side device 70 is further configured to run the computer program to execute the steps of the method in embodiment 1. Elaborations are omitted herein.

Embodiment 4

Figure 9:
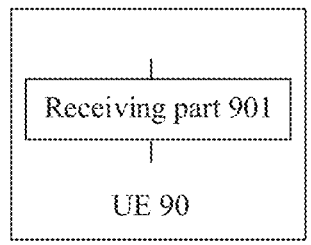
FIG. 9 is a schematic composition diagram of UE according to an embodiment of the disclosure.

Based on the same inventive concept as the abovementioned embodiments, referring to FIG. 9, a composition of UE 90 provided in the embodiment of the disclosure is illustrated. The UE 90 may include a receiving part 901, configured to receive a paging message corresponding to the UE according to information associated with the UE.

In the solution, the information includes at least one of: a P-RNTI corresponding to the UE, a CORESET corresponding to the UE or a search space corresponding to the UE.

In the solution, the receiving part 901 is further configured to:

determine the P-RNTI, CORESET or search space corresponding to the UE through a system message, a broadcast message or RMSI; or determine a candidate set of the P-RNTIs, CORESETs or search spaces corresponding to the UE through the system message, the broadcast message or the RMSI; or determine the P-RNTI, CORESET or search space corresponding to the UE through dedicated signaling; or determine the candidate set of P-RNTIs, CORESETs or search spaces corresponding to the UE through the dedicated signaling; or specify the P-RNTI corresponding to the UE or the candidate set of the P-RNTIs corresponding to the UE according to a set communication protocol.

In the solution, the receiving part 901 is specifically configured to:

receive DCI according to information corresponding to the UE;

receive a PDSCH according to the DCI; and acquire the paging message from the PDSCH.

In the solution, the receiving part 901 is specifically configured to:

at a PO of the UE, detect the DCI sent by a network side based on the information associated with the UE and receive the DCI.

In the solution, the receiving part 901 is specifically configured to:

receive the PDSCH corresponding to the DC according to scheduling indication information, carried in the DCI, of the PDSCH.

In the solution, the receiving part 901 is specifically configured to receive the PDSCH within a present minimum frequency-domain range of the UE according to a minimum bandwidth.

In the solution, the receiving part 901 is specifically configured to receive the PDSCH within the present minimum frequency-domain range of the UE and outside the present minimum frequency-domain range of the UE according to the minimum bandwidth; or receive the PDSCH outside the present minimum frequency-domain range of the UE according to the minimum bandwidth.

In the solution, the receiving part 901 is further configured to:

if a present bandwidth of the UE is within the minimum frequency-domain range, tune RF within a time interval indicated by the scheduling indication information of the PDSCH.

In the solution, the receiving part 901 is specifically configured to receive part of the PDSCH according to a bandwidth less than or equal to an actual bandwidth or reported bandwidth of the UE.

In addition, the embodiment provides a computer-readable medium, which stores an information transmission program that, when executed by at least one processor, implements the steps of the method of embodiment 2. Specific elaborations about the computer-readable medium refer to the descriptions in embodiment 3 and are omitted herein.

Figure 10:
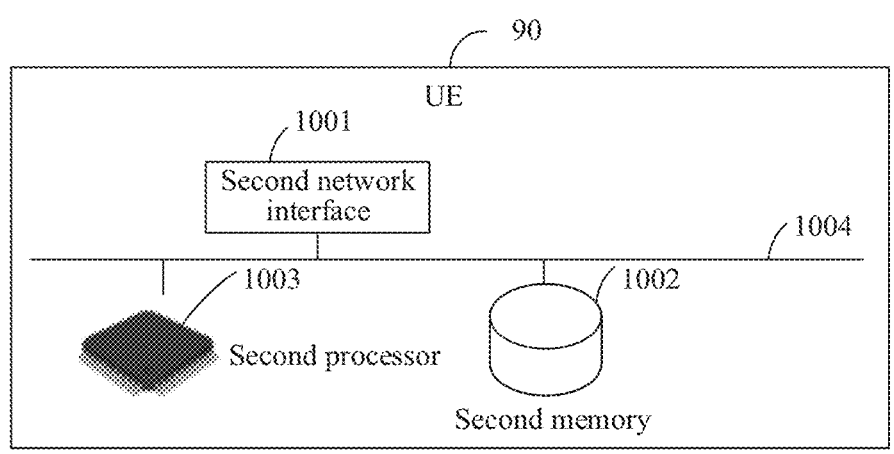
FIG. 10 is a schematic hardware structure diagram of UE according to an embodiment of the disclosure.

Based on the composition of the UE 90 and the computer-readable medium, referring to FIG. 10, a specific hardware structure of the UE 90 provided in the embodiment of the disclosure is illustrated. The UE 90 may include a second network interface 1001, a second memory 1002 and a second processor 1003. Each component is coupled together through a bus system 1004. It may be understood that the bus system 1004 is configured to implement connection communication among these components. The bus system 1004 includes a data bus, and further includes a power bus, a control bus and a state signal bus. However, for clear description, various buses in FIG. 10 are marked as the bus system 1004.

The second network interface 1001 is configured to receive and send a signal in a process of receiving and sending information with other external network elements.

The second memory 1002 is configured to store a computer program capable of running on the second processor 1003.

The second processor 1003 is configured to execute the following operation when the computer program is running on the second processor.

A paging message corresponding to the UE is received according to information associated with the UE.

It may be understood that the components in the specific hardware structure of the UE 90 in the embodiment are similar to the corresponding parts in embodiment 3 and will not be elaborated herein.

Specifically, the second processor 1003 in the UE 90 is further configured to run the computer program to execute the steps of the method in embodiment 2. Elaborations are omitted herein.

Those skilled in the art should know that the embodiment of the disclosure may be provided as a method, a system or a computer program product. Therefore, the disclosure may adopt a form of hardware embodiment, software embodiment or an embodiment combining software and hardware. Moreover, the disclosure may adopt a form that computer program product is implemented on one or more computer-available storage media (including, but not limited to, a disk memory and an optical memory) including computer-available program codes.

The disclosure is described with reference to flowcharts and/or block diagrams of the method, device (system) and computer program product according to the embodiments of the disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of another programmable data processing device to generate a machine, such that a device for realizing a function specified in one flow or multiple flows in the flowcharts and/or one block or multiple blocks in the block diagrams is generated by the instructions executed through the computer or the processor of other programmable data processing devices.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or multiple flows in the flowcharts and/or one block or multiple blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or multiple flows in the flowcharts and/or one block or multiple blocks in the block diagrams are provided by the instructions executed on the computer or the other programmable data processing device.

The above is only the preferred embodiment of the disclosure and not intended to limit the scope of protection of the disclosure.

INDUSTRIAL APPLICABILITY

In the embodiments of the disclosure, a plurality pieces of DCI are sent at the same time. Although only one PDSCH is allocated and scheduled to carry a paging message for a single piece of DCI, if the paging message still includes paging notifications for a plurality of UEs, more users may be notified within the same time, compared with the conventional LTE related art, such that the paging delay may be reduced. In addition, the UE is scheduled outside the minimum UE bandwidth range to receive the PDSCH, such that frequency-domain resources available for paging are increased to increase scheduling opportunities, and the paging delay may further be reduced.

The invention claimed is:

1. A method for information transmission, applied to a User Equipment (UE) and comprising:
receiving a paging message corresponding to the UE according to information associated with the UE;
wherein the information comprises at least one of:
a Paging-Radio Network Temporary Identity (P-RNTI) corresponding to the UE, a Control Resource SET (CORESET) corresponding to the UE and a search space corresponding to the UE;
wherein receiving the paging message corresponding to the UE according to the information associated with the UE comprises:
at a Paging Occasion (PO) of the UE, detecting Downlink Control Information (DCI) corresponding to the UE in a plurality pieces of DCI, which are sent by a base station at a same time based on the information associated with the UE and receiving the DCI;
receiving a Physical Downlink Shared Channel (PDSCH) according to the DCI; and
acquiring the paging message from the PDSCH;
wherein receiving the PDSCH according to the DCI comprises:
receiving the PDSCH corresponding to the DCI according to scheduling indication information, carried in the DCI, of the PDSCH,
wherein the DCI is configured to indicate a time interval between the DCI and the PDSCH, the time interval between the DCI and the PDSCH being set according to a time interval setting strategy.

2. The method of claim 1, further comprising:
determining the CORESET or search space corresponding to the UE through dedicated signaling.

3. The method of claim 1, further comprising:
determining the P-RNTI corresponding to the UE according to a communication protocol.

4. The method of claim 1, wherein receiving the PDSCH corresponding to the DCI according to the scheduling indication information, carried in the DCI, of the PDSCH comprises:
receiving the PDSCH within a present minimum frequency-domain range of the UE and outside the present minimum frequency-domain range of the UE according to a minimum bandwidth; or
receiving the PDSCH outside the present minimum frequency-domain range of the UE according to the minimum bandwidth; or
receiving the PDSCH within a present minimum frequency-domain range of the UE and outside the present minimum frequency-domain range of the UE according to the scheduling indication information, carried in the DCI transmitted through a PDCCH, of the PDSCH, wherein the frequency-domain bandwidth of the PDCCH is less than or equal to a minimum bandwidth; or
receiving the PDSCH outside the present minimum frequency-domain range of the UE according to the scheduling indication information, carried in the DCI transmitted through the PDCCH, of the PDSCH, wherein the frequency-domain bandwidth of the PDCCH is less than or equal to the minimum bandwidth.

5. User Equipment (UE), comprising a second network interface, a second memory and a second processor, wherein the second network interface is configured to receive and send a signal in a process of receiving and sending information with other external network elements;
the second memory is configured to store a computer program capable of running on the second processor; and
the second processor is configured to receive a paging message corresponding to the UE according to information associated with the UE;
wherein the information comprises at least one of:
a Paging-Radio Network Temporary Identity (P-RNTI) corresponding to the UE, a Control Resource SET (CORESET) corresponding to the UE and a search space corresponding to the UE;
wherein the second processor is specifically configured to:
at a Paging Occasion (PO) of the UE, detect Downlink Control Information (DCI) corresponding to the UE in a plurality pieces of DCI, which are sent by a base station at a same time based on the information associated with the UE and receive the DCI;
receive a Physical Downlink Shared Channel (PDSCH) according to the DCI; and
acquire the paging message from the PDSCH;
wherein the second processor is specifically configured to:
receive the PDSCH corresponding to the DCI according to scheduling indication information, carried in the DCI, of the PDSCH,
wherein the DCI is configured to indicate a time interval between the DCI and the PDSCH, the time interval between the DCI and the PDSCH being set according to a time interval setting strategy.

6. The UE of claim 5, wherein the second processor is further configured to:
determine the CORESET or search space corresponding to the UE through dedicated signaling.

7. The UE of claim 5, wherein the second processor is further configured to:
determine the P-RNTI corresponding to the UE according to a communication protocol.

8. The UE of claim 5, wherein the second processor is specifically configured to receive the PDSCH within a present minimum frequency-domain range of the UE and outside the present minimum frequency-domain range of the UE according to a minimum bandwidth; or
receive the PDSCH outside the present minimum frequency-domain range of the UE according to the minimum bandwidth; or
receive the PDSCH within a present minimum frequency-domain range of the UE and outside the present minimum frequency-domain range of the UE according to the scheduling indication information, carried in the DCI transmitted through a PDCCH, of the PDSCH, wherein the frequency-domain bandwidth of the PDCCH is less than or equal to a minimum bandwidth; or
receive the PDSCH outside the present minimum frequency-domain range of the UE according to the scheduling indication information, carried in the DCI transmitted through the PDCCH, of the PDSCH, wherein the frequency-domain bandwidth of the PDCCH is less than or equal to the minimum bandwidth.

9. A method for information transmission, applied to a base station and comprising:
sending a paging message according to information associated with at least one target User Equipment (UE) to which the paging message needs to be sent, wherein the information associated with a target UE corresponds to physical Downlink Control Information (DCI) in a plurality pieces of DCI which are sent by the base station at a same time;

wherein the information associated with the target UE comprises any one of:

a Paging-Radio Network Temporary Identity (P-RNTI) corresponding to the target UE, a Control Resource SET (CORESET) corresponding to the target UE or a search space corresponding to the target UE;

wherein the method further comprises:

scheduling a frequency-domain resource of the PDSCH according to a scheduling strategy, and generating scheduling indication information, wherein the method further comprises:

setting a time interval between the DCI and the PDSCH according to a time interval setting strategy, wherein the DCI has a capability to indicate the time interval between the DCI and the PDSCH.

10. The method of claim 9, further comprising:
notifying, the CORESET or search space corresponding to the UE, to the UE through dedicated signaling.

11. The method of claim 9, further comprising:
determining the P-RNTI corresponding to the UE according to a communication protocol.

12. The method of claim 9, wherein sending the paging message according to the information associated with the at least one target UE to which the paging message needs to be sent comprises:

carrying the paging messages, corresponding to the target UEs with the same information, of all paging messages on the same PDSCH, wherein physical DCI corresponding to each PDSCH corresponds to the information corresponding to the target UE.

13. The method of claim 9, wherein scheduling the frequency-domain resource of the PDSCH according to the scheduling strategy and generating the scheduling indication information comprises:

scheduling a frequency-domain bandwidth for transmission of the PDSCH carrying the paging messages to be less than or equal to a minimum bandwidth;

scheduling part of a frequency-domain position for transmission of the PDSCH carrying the paging messages within a present minimum frequency-domain range of the target UE, and scheduling the other part of the frequency-domain position of the PDSCH outside the present minimum frequency-domain range of the target UE; or scheduling the frequency-domain position of the PDSCH outside the present minimum frequency-domain range of the target UE; and generating the scheduling indication information, wherein the frequency-domain bandwidth, indicated in the scheduling indication information, of the PDSCH is less than or equal to the minimum bandwidth, part of the frequency-domain position of the PDSCH is within the present minimum frequency-domain range of the target UE, and the other part of the frequency-domain position of the PDSCH is outside the present minimum frequency-domain range of the target UE; or the frequency-domain bandwidth indicating the PDSCH is less than or equal to the minimum bandwidth, and the frequency-domain position of the PDSCH is outside the present minimum frequency-domain range of the target UE.

14. A base station, comprising a sending part, configured to send a paging message according to information associated with at least one target User Equipment (UE) to which the paging message needs to be sent, wherein the information associated with a target UE corresponds to physical Downlink Control Information (DCI) in a plurality pieces of DCI which are sent by the base station at a same time;

wherein the information associated with the target UE comprises any one of:

a Paging-Radio Network Temporary Identity (P-RNTI) corresponding to the target UE, a Control Resource SET (CORESET) corresponding to the target UE or a search space corresponding to the target UE;

wherein the sending part is further configured to:

schedule a frequency-domain resource of the PDSCH according to a scheduling strategy, and generate scheduling indication information, wherein the sending part is specifically configured to:

set a time interval between the DCI and the PDSCH according to a time interval setting strategy, wherein the DCI has a capability to indicate the time interval between the DCI and the PDSCH.

* * * * *